United States Patent
Tchakarov et al.

(10) Patent No.: US 12,228,027 B2
(45) Date of Patent: *Feb. 18, 2025

(54) UNIVERSAL BOTTOMHOLE ASSEMBLY NODE (UBHAN)

(71) Applicant: WELL RESOLUTIONS TECHNOLOGY, Houston, TX (US)

(72) Inventors: Borislav J. Tchakarov, Houston, TX (US); Tsili Wang, Houston, TX (US)

(73) Assignee: WELL RESOLUTIONS TECHNOLOGY

( * ) Notice: Subject to any disclaimer, the term of this patent is extended or adjusted under 35 U.S.C. 154(b) by 87 days.

This patent is subject to a terminal disclaimer.

(21) Appl. No.: 17/741,033

(22) Filed: May 10, 2022

(65) Prior Publication Data
US 2022/0341310 A1  Oct. 27, 2022

Related U.S. Application Data

(60) Continuation of application No. 17/072,913, filed on Oct. 16, 2020, now Pat. No. 11,326,437, which is a
(Continued)

(51) Int. Cl.
*E21B 47/022*  (2012.01)
*E21B 7/06*  (2006.01)
(Continued)

(52) U.S. Cl.
CPC ............ *E21B 44/005* (2013.01); *E21B 7/062* (2013.01); *E21B 7/068* (2013.01); *E21B 47/022* (2013.01);
(Continued)

(58) Field of Classification Search
CPC ........ E21B 7/04; E21B 7/062; E21B 17/1078; E21B 44/005; E21B 47/02; E21B 47/022;
(Continued)

(56) References Cited

U.S. PATENT DOCUMENTS 4,899,112 A * 2/1990 Clark .................. G01V 3/30
  324/338
5,603,386 A * 2/1997 Webster ............... E21B 44/005
  175/45
(Continued)

FOREIGN PATENT DOCUMENTS

CN  109690014 A * 4/2019 ............ E21B 17/04
EP  235478 A * 9/1987 ......... E21B 17/1021
(Continued)

*Primary Examiner* — Jennifer H Gay
(74) *Attorney, Agent, or Firm* — Hunton Andrews Kurth LLP

(57) ABSTRACT

The present application pertains to a universal bottom hole assembly node module. The module may comprise an azimuthal resistivity module, an azimuthal gamma module, a pressure while drilling module, or any combination thereof. A communication system may be configured to provide two way communication between two or more components of a bottom hole assembly, for example, between a rotary steerable system and a measurement while drilling system. This advantageously allows real time geosteering, well control, hydraulics analysis for drilling optimization, and/or evaluation of motor efficiency.

17 Claims, 16 Drawing Sheets

Related U.S. Application Data continuation-in-part of application No. 16/790,384, filed on Feb. 13, 2020, now Pat. No. 11,098,572, which is a continuation of application No. 16/126,485, filed on Sep. 10, 2018, now Pat. No. 10,648,319, which is a continuation of application No. 15/937,459, filed on Mar. 27, 2018, now Pat. No. 10,072,490, which is a continuation-in-part of application No. 15/920,034, filed on Mar. 13, 2018, now Pat. No. 10,253,614, which is a continuation of application No. 15/696,543, filed on Sep. 6, 2017, now Pat. No. 9,952,347, which is a continuation of application No. 15/466,507, filed on Mar. 22, 2017, now Pat. No. 9,767,153, which is a division of application No. 14/993,165, filed on Jan. 12, 2016, now Pat. No. 9,645,276, which is a division of application No. 14/303,232, filed on Jun. 12, 2014, now Pat. No. 9,268,053, application No. 17/741,033, filed on May 10, 2022 is a continuation of application No. 16/421,738, filed on May 24, 2019, now Pat. No. 11,466,565, which is a continuation of application No. 15/466,220, filed on Mar. 22, 2017, now Pat. No. 10,337,322, which is a continuation of application No. 14/307,293, filed on Jun. 17, 2014, now Pat. No. 9,638,819, application No. 17/741,033, filed on May 10, 2022 is a continuation of application No. 16/379,261, filed on Apr. 9, 2019, now Pat. No. 11,008,850, which is a continuation of application No. 14/738,071, filed on Jun. 12, 2015, now Pat. No. 10,591,635.

(60) Provisional application No. 61/834,272, filed on Jun. 12, 2013, provisional application No. 61/836,577, filed on Jun. 18, 2013, provisional application No. 62/012,163, filed on Jun. 13, 2014.

(51) Int. Cl.

| | | |
|---|---|---|
| *E21B 44/00* | (2006.01) | |
| *E21B 47/024* | (2006.01) | |
| *E21B 47/026* | (2006.01) | |
| *E21B 47/06* | (2012.01) | |
| *E21B 47/09* | (2012.01) | |
| *E21B 47/13* | (2012.01) | |
| *E21B 49/00* | (2006.01) | |
| *G01V 3/12* | (2006.01) | |
| *G01V 3/26* | (2006.01) | |
| *G01V 3/28* | (2006.01) | |
| *G01V 3/30* | (2006.01) | |
| *G01V 3/34* | (2006.01) | |
| *G01V 11/00* | (2006.01) | |
| *G06F 16/2455* | (2019.01) | |
| *G06F 16/2457* | (2019.01) | |
| *E21B 17/10* | (2006.01) | |
| *E21B 47/01* | (2012.01) | |

(52) U.S. Cl.
CPC .......... *E21B 47/024* (2013.01); *E21B 47/026* (2013.01); *E21B 47/06* (2013.01); *E21B 47/09* (2013.01); *E21B 47/13* (2020.05); *E21B 49/00* (2013.01); *G01V 3/12* (2013.01); *G01V 3/26* (2013.01); *G01V 3/28* (2013.01); *G01V 3/30* (2013.01); *G01V 3/34* (2013.01); *G01V 11/002* (2013.01); *G06F 16/24554* (2019.01); *G06F 16/24578* (2019.01); *E21B 17/1078* (2013.01); *E21B 47/01* (2013.01)

(58) Field of Classification Search
CPC .. E21B 47/02216; E21B 47/024; E21B 47/09; G01V 3/12; G01V 3/30; G01V 3/34
See application file for complete search history.

(56) References Cited

U.S. PATENT DOCUMENTS

| | | | | |
|---|---|---|---|---|
| 5,679,894 | A * | 10/1997 | Kruger | E21B 47/06 73/152.01 |
| 6,088,294 | A * | 7/2000 | Leggett, III | E21B 44/00 175/45 |
| 6,234,259 | B1 * | 5/2001 | Kuckes | E21B 44/005 175/73 |
| 6,427,783 | B2 * | 8/2002 | Krueger | E21B 17/0283 175/50 |
| 6,467,557 | B1 * | 10/2002 | Krueger | E21B 4/18 175/45 |
| 7,027,926 | B2 * | 4/2006 | Haugland | G01V 11/00 702/9 |
| 7,222,681 | B2 * | 5/2007 | Jones | E21B 47/12 73/152.43 |
| 7,245,229 | B2 * | 7/2007 | Baron | G01V 11/002 702/9 |
| 7,250,768 | B2 * | 7/2007 | Ritter | G01V 3/30 73/152.43 |
| 7,287,604 | B2 * | 10/2007 | Aronstam | E21B 17/1014 175/73 |
| 7,436,184 | B2 * | 10/2008 | Moore | G01V 3/24 324/355 |
| 7,593,399 | B2 * | 9/2009 | Nishihara | H04Q 11/0478 370/389 |
| 7,659,722 | B2 * | 2/2010 | Bittar | G01V 3/28 702/7 |
| 7,723,991 | B2 * | 5/2010 | Signorelli | G01V 3/28 324/338 |
| 7,950,473 | B2 * | 5/2011 | Sugiura | E21B 7/062 175/45 |
| 8,347,985 | B2 | 1/2013 | Bitter et al. | |
| 8,369,331 | B2 * | 2/2013 | Nishihara | H04L 69/22 370/392 |
| 9,206,644 | B2 * | 12/2015 | Clark | E21B 7/04 |
| 9,268,053 | B2 * | 2/2016 | Wang | G06F 16/24578 |
| 9,540,922 | B2 * | 1/2017 | Zhong | G01V 3/26 |
| 9,638,819 | B2 * | 5/2017 | Wang | E21B 47/13 |
| 9,645,276 | B2 * | 5/2017 | Wang | E21B 47/024 |
| 9,767,153 | B2 * | 9/2017 | Wang | E21B 7/062 |
| 9,797,204 | B2 * | 10/2017 | Kirkhope | E21B 17/021 |
| 9,835,020 | B2 | 12/2017 | Bayliss et al. | |
| 9,851,467 | B2 * | 12/2017 | Bittar | E21B 47/026 |
| 9,952,347 | B2 * | 4/2018 | Wang | E21B 49/00 |
| 10,072,490 | B1 * | 9/2018 | Tchakarov | E21B 47/024 |
| 10,119,385 | B2 * | 11/2018 | Williams | E21B 47/06 |
| 10,337,322 | B2 * | 7/2019 | Wang | G01V 3/28 |
| 10,760,412 | B2 * | 9/2020 | Kaur | E21B 17/028 |
| 11,098,572 | B2 * | 8/2021 | Tchakarov | G06F 16/24554 |
| 11,326,437 | B2 * | 5/2022 | Tchakarov | E21B 47/022 |
| 2001/0042643 | A1 | 11/2001 | Krueger | E21B 17/0283 175/73 |
| 2001/0052428 | A1 * | 12/2001 | Larronde | E21B 7/067 175/73 |
| 2005/0001624 | A1 * | 1/2005 | Ritter | G01V 3/24 324/374 |
| 2005/0056463 | A1 * | 3/2005 | Aronstam | E21B 10/62 175/73 |
| 2005/0189946 | A1 * | 9/2005 | Moore | E21B 47/002 324/338 |
| 2005/0198846 | A1 | 9/2005 | Nagata | |
| 2006/0011385 | A1 * | 1/2006 | Seydoux | G01V 3/28 324/333 |
| 2006/0120365 | A1 * | 6/2006 | Nishihara | H04Q 11/0478 370/466 |
| 2006/0208738 | A1 * | 9/2006 | Moore | G01V 3/24 324/344 |

(56) References Cited

U.S. PATENT DOCUMENTS

| | | | |
|---|---|---|---|
| 2007/0107937 A1* | 5/2007 | Sugiura | E21B 7/062 175/45 |
| 2007/0289373 A1* | 12/2007 | Sugiura | E21B 7/062 73/152.01 |
| 2009/0302851 A1* | 12/2009 | Bittar | E21B 47/026 324/338 |
| 2010/0020803 A1* | 1/2010 | Nishihara | H04L 69/22 370/395.1 |
| 2010/0126770 A1* | 5/2010 | Sugiura | E21B 17/1014 175/45 |
| 2011/0133740 A1* | 6/2011 | Seydoux | G01V 3/28 324/338 |
| 2011/0234230 A1* | 9/2011 | Bittar | E21B 47/013 324/333 |
| 2011/0308794 A1* | 12/2011 | Bittar | E21B 47/0228 166/254.2 |
| 2012/0186873 A1* | 7/2012 | Shayegi | E21B 44/00 175/25 |
| 2012/0298420 A1* | 11/2012 | Seydoux | E21B 47/026 706/46 |
| 2013/0124095 A1* | 5/2013 | Sugiura | E21B 44/00 702/9 |
| 2013/0128901 A1* | 5/2013 | Nishihara | H04L 69/22 370/474 |
| 2013/0226459 A1* | 8/2013 | Gorek | E21B 47/024 702/7 |
| 2013/0226461 A1* | 8/2013 | Yu | E21B 49/00 702/9 |
| 2014/0097026 A1* | 4/2014 | Clark | E21B 17/028 175/73 |
| 2014/0107929 A1* | 4/2014 | Zhong | G01V 3/26 702/7 |
| 2014/0291024 A1* | 10/2014 | Sugiura | E21B 7/04 175/45 |
| 2014/0368197 A1* | 12/2014 | Wang | E21B 47/09 324/333 |
| 2014/0368199 A1* | 12/2014 | Bittar | E21B 47/01 324/337 |
| 2015/0144401 A1* | 5/2015 | Nagaraj | E21B 17/1078 175/320 |
| 2016/0061019 A1* | 3/2016 | Blangé | E21B 44/005 175/26 |
| 2016/0124107 A1* | 5/2016 | Wang | G01V 3/28 702/7 |
| 2016/0245080 A1* | 8/2016 | Sun | E21B 49/00 |
| 2016/0356099 A1* | 12/2016 | Kirkhope | E21B 4/16 |
| 2017/0130543 A1* | 5/2017 | Hagar | E21B 7/062 |
| 2017/0193050 A1* | 7/2017 | Wang | E21B 7/062 |
| 2017/0234081 A1* | 8/2017 | Kirkhope | E21B 17/021 166/378 |
| 2017/0242153 A1* | 8/2017 | Yang | G01V 11/00 |
| 2017/0248013 A1* | 8/2017 | Yang | G01V 5/125 |
| 2017/0350229 A1* | 12/2017 | Hoehn | E21B 44/02 |
| 2017/0371063 A1* | 12/2017 | Wang | G06F 16/24554 |
| 2018/0024266 A1* | 1/2018 | Wang | G01V 3/28 324/338 |
| 2018/0334897 A1* | 11/2018 | Samuel | E21B 7/04 |
| 2019/0010798 A1* | 1/2019 | Tchakarov | G01V 3/26 |
| 2019/0265381 A1* | 8/2019 | Sugiura | G01V 3/18 |
| 2019/0277136 A1* | 9/2019 | Wang | E21B 47/13 |
| 2019/0309621 A1* | 10/2019 | Kaur | E21B 4/02 |
| 2021/0032971 A1* | 2/2021 | Tchakarov | G01V 3/28 |
| 2022/0341310 A1* | 10/2022 | Tchakarov | E21B 47/09 |

FOREIGN PATENT DOCUMENTS

| | | | |
|---|---|---|---|
| EP | 0235478 A2 | 11/1993 | |
| WO | WO-2014177505 A1 * | 11/2014 | E21B 41/0085 |
| WO | WO-2019133003 A1 * | 7/2019 | E21B 21/08 |

* cited by examiner

UNIVERSAL BOTTOMHOLE ASSEMBLY NODE (UBHAN)

CROSS-REFERENCE TO RELATED APPLICATIONS

The present application is a continuation of Ser. No. 17/072,913 filed Oct. 16, 2020 issuing as U.S. Pat. No. 11,326,437 on May 10, 2022 which application is a continuation-in-part of U.S. Ser. No. 16/790,384 filed Feb. 13, 2020 titled "BOUNDARY TRACKING CONTROL MODULE FOR ROTARY STEERABLE SYSTEMS" which is a continuation of U.S. application Ser. No. 16/126,485, filed on Sep. 10, 2018 (now U.S. Pat. No. 10,648,319) which is a continuation of U.S. application Ser. No. 15/937,459 filed on Mar. 27, 2018 (now U.S. Pat. No. 10,072,490), which is a continuation-in-part of U.S. application Ser. No. 15/920,034 filed Mar. 13, 2018 (now U.S. Pat. No. 10,253,614), which is a continuation of U.S. application Ser. No. 15/696,543, filed Sep. 6, 2017 (now U.S. Pat. No. 9,952,347), which is a continuation of U.S. application Ser. No. 15/466,507, filed Mar. 22, 2017 (now U.S. Pat. No. 9,767,153), which claims priority to U.S. application Ser. No. 14/993,165, filed Jan. 12, 2016 (now U.S. Pat. No. 9,645,276), which claims priority to U.S. application Ser. No. 14/303,232, filed Jun. 12, 2014 (now U.S. Pat. No. 9,268,053), which claims priority to U.S. Provisional Application No. 61/834,272 filed Jun. 12, 2013, all of which are incorporated herein by reference in their entireties.

The application also claims priority to U.S. Ser. No. 16/421,738 filed May 24, 2019 titled "Modular Resistivity Sensor for Downhole Measurement While Drilling" which application is a continuation of U.S. Ser. No. 15/466,220 filed Mar. 22, 2017 (now U.S. Pat. No. 10,337,322) which application is a continuation of U.S. Ser. No. 14/307,293 filed Jun. 17, 2014 (now U.S. Pat. No. 9,638,819) which application claims priority from U.S. provisional application No. 61/836,577 filed Jun. 18, 2013 and which applications are incorporated herein by reference in their entirety.

The application also claims priority to U.S. Ser. No. 16/379,261 titled "APPARATUS AND METHODS FOR MAKING AZIMUTHAL RESISTIVITY MEASUREMENTS" filed Apr. 9, 2019 which is a continuation of U.S. U.S. Ser. No. 14/738,071 filed Jun. 12, 2015 now U.S. Pat. No. 10,591,635 which claims priority under 35 U.S.C. § 119(e) to U.S. Provisional Patent Application No. 62/012,163, filed Jun. 13, 2014, and which applications are incorporated herein by reference in their entirety.

FIELD OF THE INVENTION

Embodiments disclosed herein relate to Universal Bottomhole Assembly Node (UBHAN) providing Communications to and from Rotary Steerable Systems, Real Time Azimuthal Resistivity and Azimuthal Gamma Imaging for Geosteering, Pressure While Drilling (PWD) for Well Control and Drilling Hydraulics and Mud Motor Efficiency. The node enables the RSS with decision making in real time for optimum well placement and communications between the RSS and MWD if needed. The node provides real time pressure while drilling to ensure safe drilling and prevent blowouts and to allow drilling hydraulics efficiency and mud motor efficiency analysis as an effective way to control the expenses for the well.

BACKGROUND AND SUMMARY

The Boundary Tracking Control Module (BTCM) utilizes an antenna array for azimuthal resistivity measurements and may be used for new builds. In some applications, the BTCM may require power from the rotary steerable system (RSS) and may not provide communications between the RSS and the measurement while drilling (MWD) above a mud motor.

Sugiura et al. US2019/0265381 A1 Aug. 29, 2019 Azimuthal Measurement for Geosteering teaches using formation anisotropy and/or azimuthally associated calculations of formation strength. However, the depth of investigation is very small and typically would not prevent exiting the formation of interest.

Bittar et al. Multimodal Geosteering Systems and Methods U.S. Pat. No. 8,347,985 B2, Jan. 8, 2013 teaches classical azimuthal and seismic azimuthal measurements for processing at the surface for analysis and decision-making. Unfortunately, such approaches are usually not suitable for downhole direct interaction with the RSS because of various tool limitations.

Bayliss et al. Directional Drilling Attitude Hold Controller U.S. Pat. No. 9,835,020 B2, Dec. 5, 2017 teaches automatic attitude control of the RSS which is pure geometrical steering. While the methodology may keep RSS on a general course for maintaining constant attitude (Vertical Depth) along the pre-programmed well profile, the RSS is limited to this parameter only without any decision making.

Thus, what is needed is a system that could provide communications to, from, and/or between a Rotary Steerable System (RSS) and an MWD system. It would further be advantageous if such a system could provide Azimuthal Resistivity and Azimuthal Gamma values to RSS for potential real time geosteering. It would further be advantageous if the system could provide Pressure While Drilling (PWD) for well control and hydraulics analysis for drilling optimization to the surface system (SS). Advantageously, the systems described herein may accomplish one or more or even all of the aforementioned needs and also have further advantages over conventional bottom hole assemblies.

The present application pertains to a Universal Bottom Hole Assembly Node (UBHAN) for providing communications to, from, and/or between Rotary Steerable System (RSS) and MWD system, Azimuthal Resistivity and Azimuthal Gamma values to RSS for real time geosteering, and Pressure While Drilling (PWD) for well control and hydraulics analysis for drilling optimization to the surface system (SS). UBHAN is configured to receive RSS drilling parameters such as, for example, Inclination and Azimuth parameters. If desired, one or more of these parameters may be sent to the surface to, for example, provide communications to, from, and/or between Rotary Steerable System (RSS) and MWD system, Azimuthal Resistivity and Azimuthal Gamma values to RSS for real time geosteering, and Pressure While Drilling (PWD) for well control and hydraulics analysis for drilling optimization to a surface system (SS).

The surface system (SS), if employed, may use various parameters such as the measured and/or vertical depth to calculate, for example, the position of the RSS. The SS may be configured to send correction commands down to the MWD if or as necessary. The MWD may send messages to the UBHAN and the UBHAN can then, if desired, send data to RSS for execution. In some embodiments, UBHAN may also send Azimuthal Resistivity (AziRes) data and/or Azimuthal Gamma (AziG) data directly or indirectly to the RSS for real time geosteering decisions and/or execution. That is, for example, the RSS may be instructed to follow a provided boundary at some predetermined distance. The same or similar AziRes and/or AziG data may be sent to the MWD for transmission to the SS for analysis and/or decisions provided based on certain geological information. The system may send PWD data to the MWD and SS for well control analysis and/or actions if or as necessary. Annulus and/or Bore PWD data may allow for optimization of the drilling parameters and/or evaluation of motor efficiency. Data sent downhole from the SS may include, for example, correction commands for the RSS.

In one embodiment, the application pertains to a bottom hole assembly. The assembly comprises a stabilizer wherein a first stabilizer end is operably attached to a first end of a rotary steerable system. The assembly also comprises a drill bit operably attached to a second end of the rotary steerable system. An assembly node system is attached to the second stabilizer end. The assembly node system comprises a mud motor configured to power the bottom hole assembly, a measurement while drilling system, and a universal bottom hole assembly node module. The universal bottom hole assembly node module is configured to provide two way communication between the rotary steerable system and the measurement while drilling system.

In another embodiment the application pertains to a bottom hole assembly similar to the one above wherein the universal bottom hole assembly node module and stabilizer position are swapped. That is, the bottom hole assembly comprises an assembly node system having a first end and a second end. The assembly node system comprises a mud motor configured to power the bottom hole assembly, a measurement while drilling system; and a universal bottom hole assembly node. The universal bottom hole assembly node module is configured to provide two way communication between the rotary steerable system and the measurement while drilling system. The bottom hole assembly also comprises a rotary steerable system attached to the first end of the assembly node system. A drill bit is operably attached to the rotary steerable system at a rotary steerable system end opposite the assembly node system. A stabilizer attached to the second end of the rotary steerable system.

In another embodiment the application pertains to a universal bottom hole assembly node module. The module comprises an azimuthal resistivity module, an azimuthal gamma module, a pressure while drilling module, or any combination thereof. The module also comprises a communication system configured to provide two way communication between a rotary steerable system and a measurement while drilling system. The communication system comprises: (1) one or more datalinks configured for direct connection to a rotary steerable system, a measurement while drilling system, or any combination thereof; or (2) one or more mass isolators configured for direct connection to a rotary steerable system, a measurement while drilling system, or any combination thereof; or (3) one or more electromagnetic antennas configured for direct connection to a rotary steerable system, a measurement while drilling system, or any combination thereof; or (4) any combination of (1), (2), and (3).

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
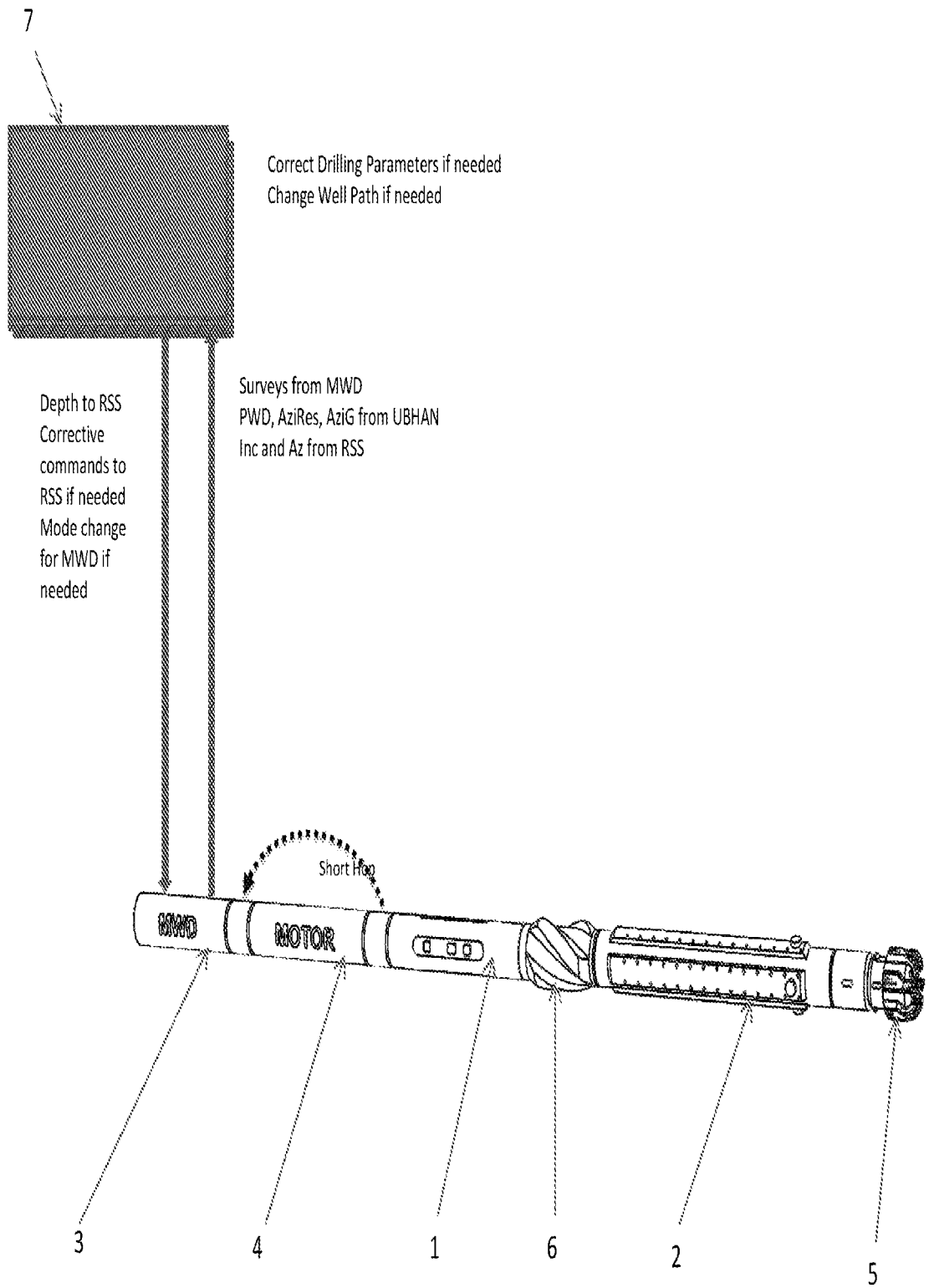
FIG. 1. Illustrates a common integration of UBHAN between an RSS and a mud motor for communications and/or real time measurements.
Figure 1A:
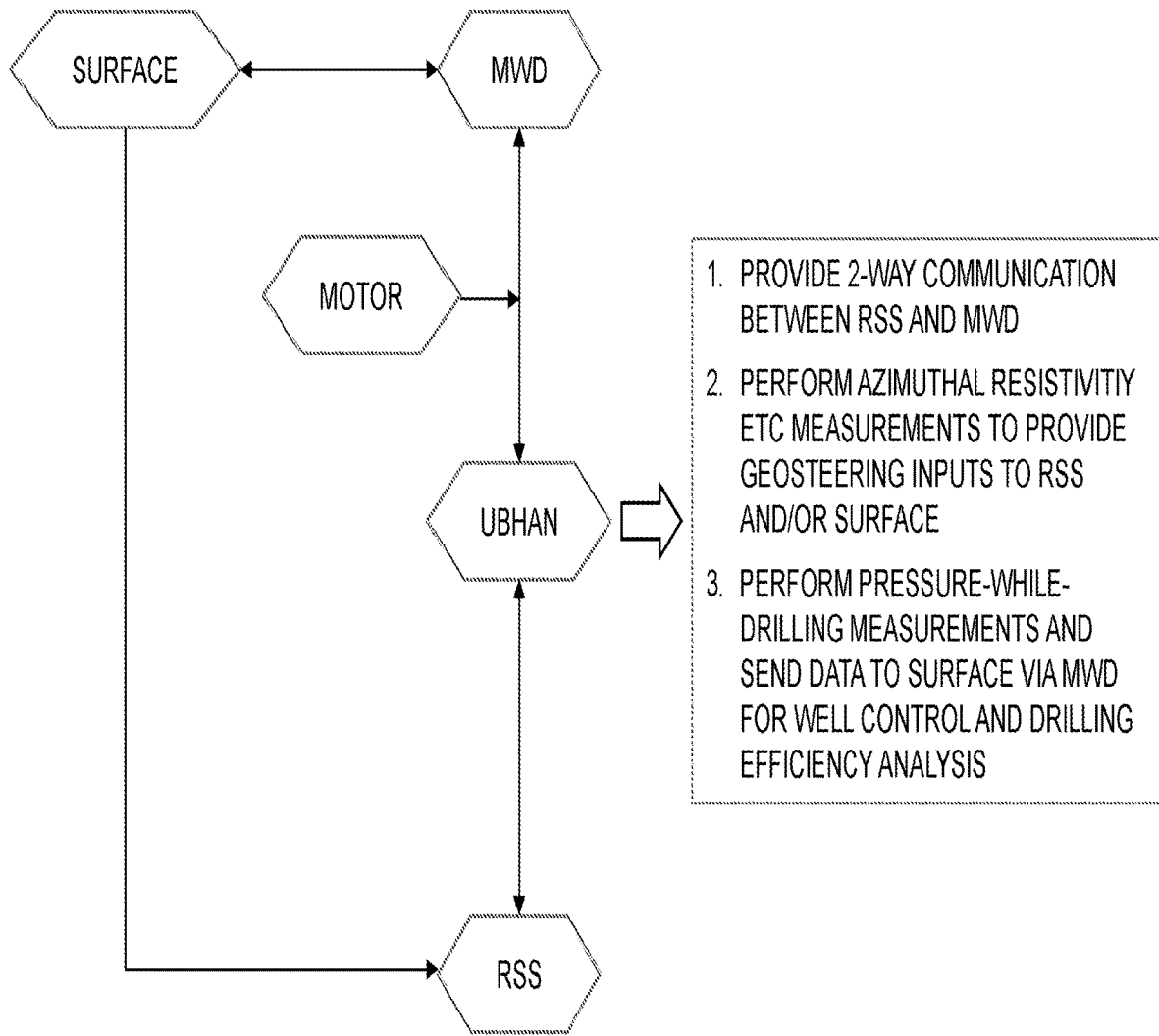
FIG. 1A. Illustrates UBHAN representative communication capabilities.

The general inventive concept is described more fully below with reference to the accompanying drawings, in which exemplary embodiments of the present invention are shown. As those skilled in the art would realize, the described embodiments may be modified in various different ways, all without departing from the spirit or scope of the present invention. The present invention should not be construed as being limited to the embodiments. Accordingly, the drawings and description are to be regarded as illustrative in nature to explain aspects of the present invention and not restrictive. Like reference numerals in the drawings designate like elements throughout the specification, and thus their description have not been repeated.

Specific Embodiments

Figure 15:
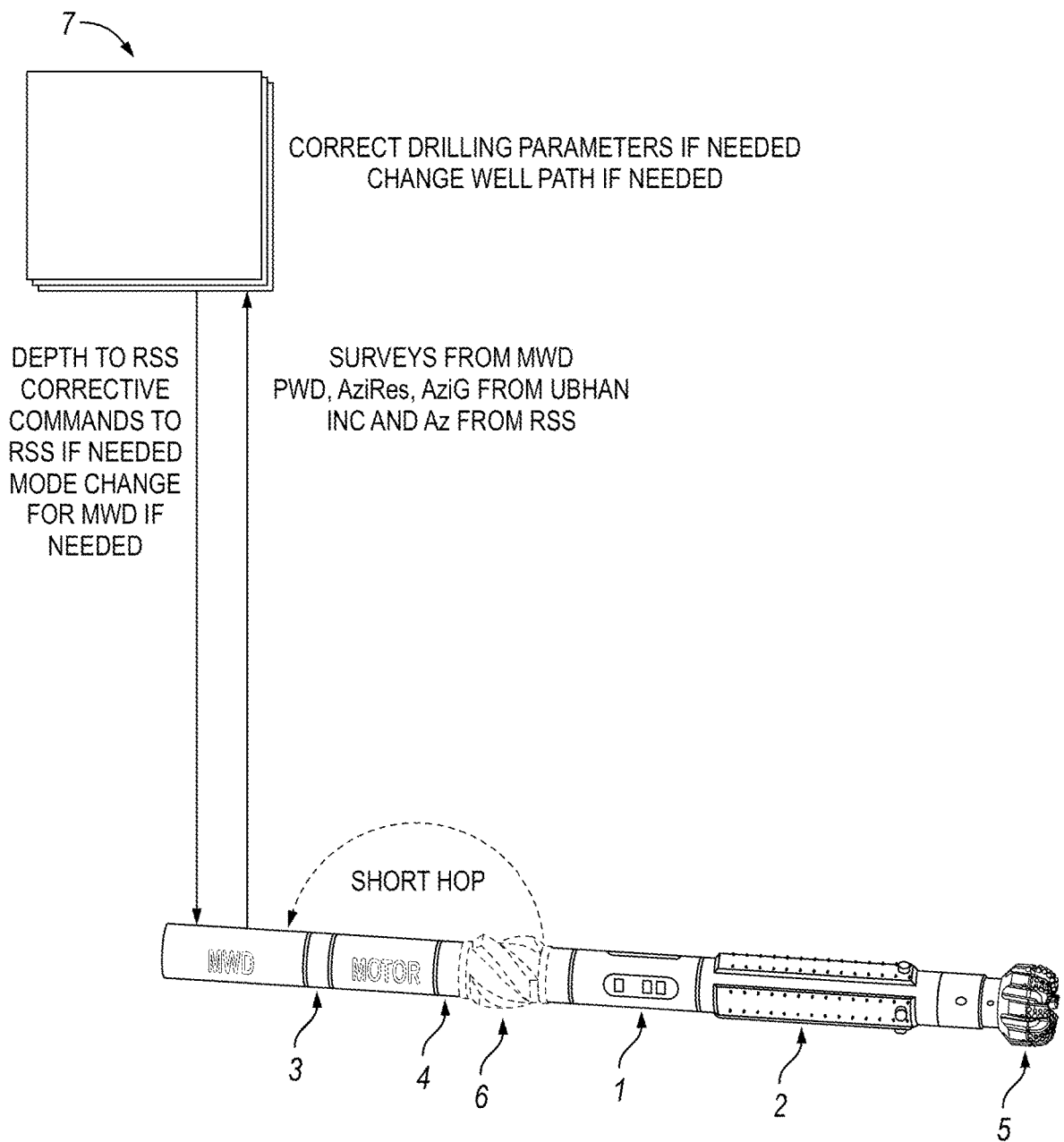
FIG. 15. Illustrates an alternative configuration wherein UHBAN 1 is positioned between stabilizer or centralizer 6 and RSS 2.

FIG. 1 illustrates an embodiment of UBHAN 1—as it is attached to the RSS 2 and the design for this configuration is illustrated in, for example, FIGS. 5, 6, 9 & 10. It should be noted that in each of these configurations the position of the stabilizer 6 and UHBAN 1 can be switched so that the UHBAN 1 is connected directly to the RSS 2 in front of UHBAN 1 as shown in FIG. 15. In FIG. 1 the RSS 2 has the drill bit 5 at the front end and stabilizer or centralizer 6 at the top end but an alternative configuration is shown in FIG. 15. The RSS 2 may send data to the UBHAN 1 via a convenient manner such as a datalink as explained later or EM transmission over short distance. The data may comprise readings for Inclination (Inc) and Azimuth (Az) of the RSS as minimum which is sometimes required by the Surface System (SS) 7 to calculate the position of the RSS knowing the measured and vertical depth. Other measurements that may be sent are values for the Earth's magnetic and gravitational fields as in some cases these may be a quality check for the sensors of the RSS. UBHAN 1 can send these values to the MWD 3 in a convenient manner such as via short hop using mass isolator 9 (FIG. 5) or EM antenna 13 (FIG. 6) and, if desired, they are transmitted to the SS 7. UBHAN 1 may measures the AziRes and/or AziG and, if desired, send at least a portion of these readings to the RSS to, for example, enable real time geosteering. In some embodiments this may assist in avoiding a deleterious track such as exiting the productive layer and instead staying at some predetermined desired distance from the boundary. At least a portion up to all of the same values may be sent to the MWD 3 and transmitted, if desired, to the SS for analysis and/or decision-making. If, for example, real time well control and hydraulics efficiency analysis are desired, then the UBHAN 1 may comprise a PWD module instead of or in addition to AziG and/or AziRes. The PWD module may provide pressure measurements which can, if desired, be sent to the MWD 3 and then, if desired, transmitted to an SS for potential analysis and/or decision making. Such analysis and/or decision making may facilitate avoiding a blowout by increasing the weight of the mud as just one of many examples that are apparent to one of ordinary skill reading this application. Similarly, based on a hydraulic analysis a pump rate could be increased or decreased to adjust hydraulic energy level for drilling optimization and efficiency. Based on the data received the SS 7 may send to the MWD 3 and UBHAN 1 one or more commands for the RSS 2 and/or MWD, e.g., re-programming (mode change) for the MWD. In some embodiments the SS may send or downlink message and/or commands to the RSS directly.

Figure 2:
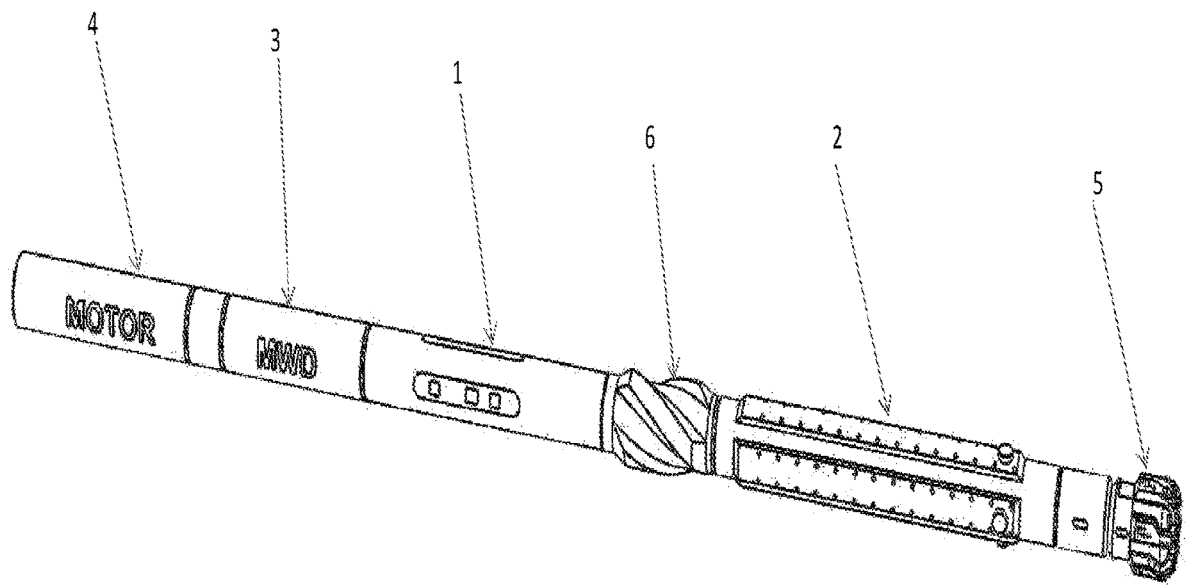
FIG. 2. Illustrates integration of UBHAN between an RSS and an MWD for communications and/or real time measurements.
Figure 7:
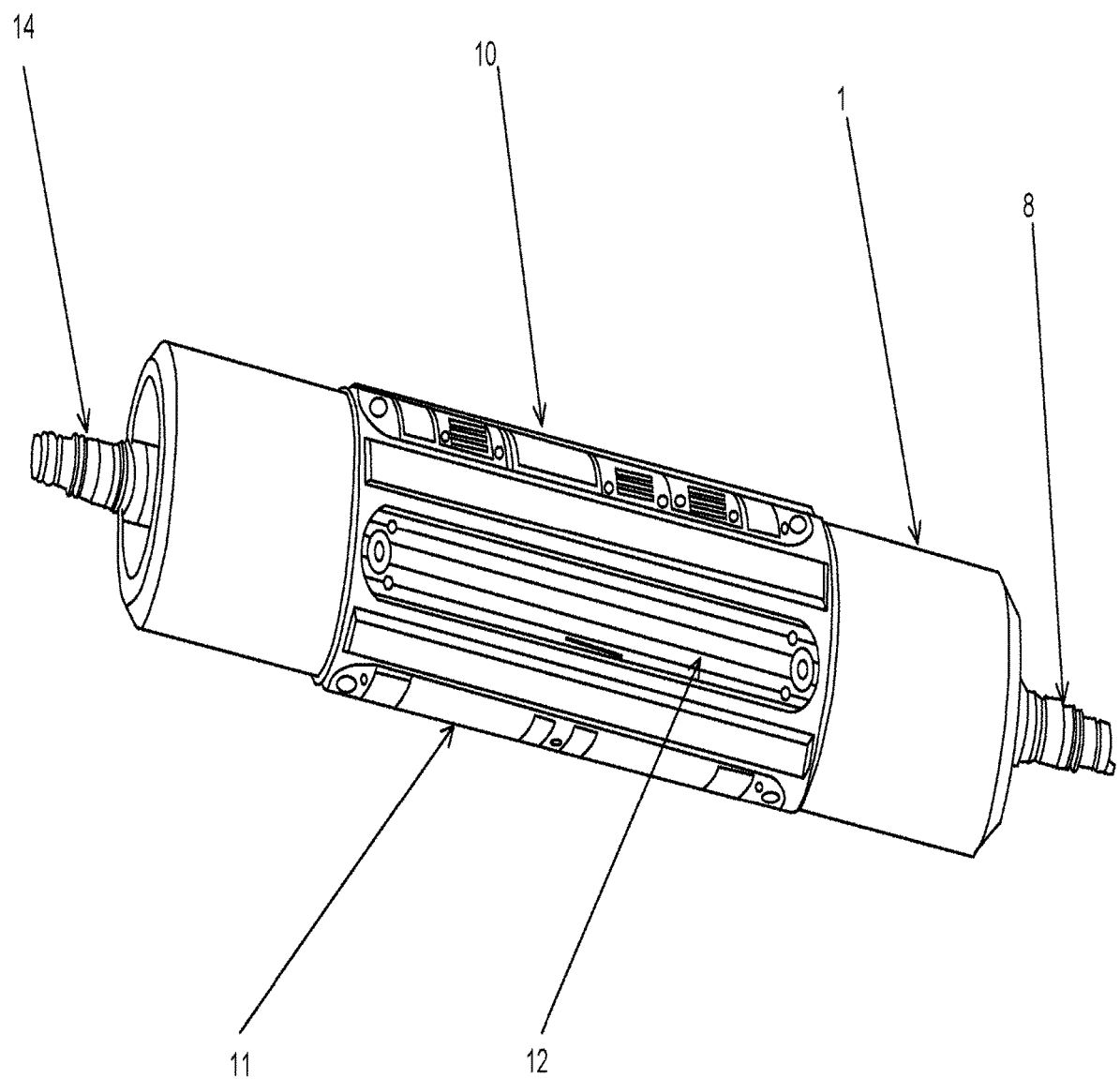
FIG. 7. Illustrates UBHAN for integration shown in FIG. 2 and FIG. 3 for communications and/or real time measurements.

FIG. 2 illustrates different functionalities of the UBHAN 1. In this particular embodiment the MWD 3 is attached to the UBHAN 1 and below the motor 4. The RSS 2, a bit 5 and a centralizer 6 are generally in the configuration shown. The UBHAN 1 can provide data flow to and from RSS 2 and MWD 3 via any convenient manner such as datalinks and/or thru bus, real time AziRes and/or AziG to the RSS 2 for real time geosteering and to the SS 7. The UBHAN design for this configuration is illustrated in FIG. 7 and for this specific application the UBHAN does not need (but could have) short hop capability.

Figure 3:
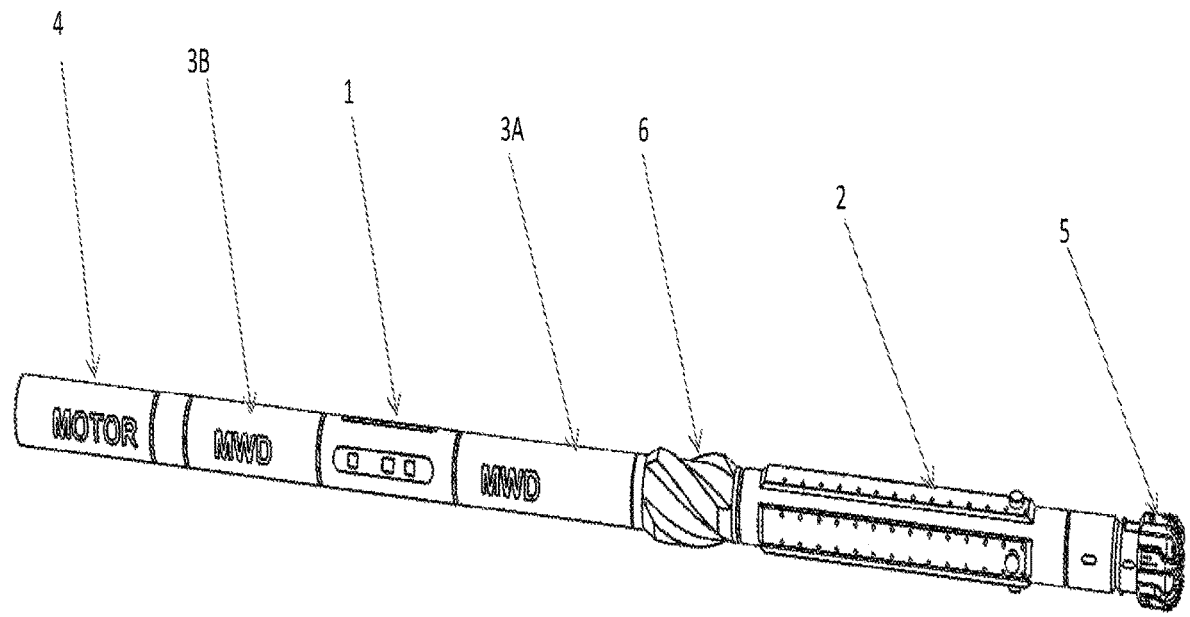
FIG. 3. Illustrates integration of UBHAN between modules of MWD for real time measurements.

In some cases the MWD 3 may be run as a split system with UBHAN 1 between bottom modules of the MWD 3A and top modules 3B as shown in FIG. 3. In such a case UBHAN may provide real time measurements and data flow and thus may not need short hop capability.

Figure 4:
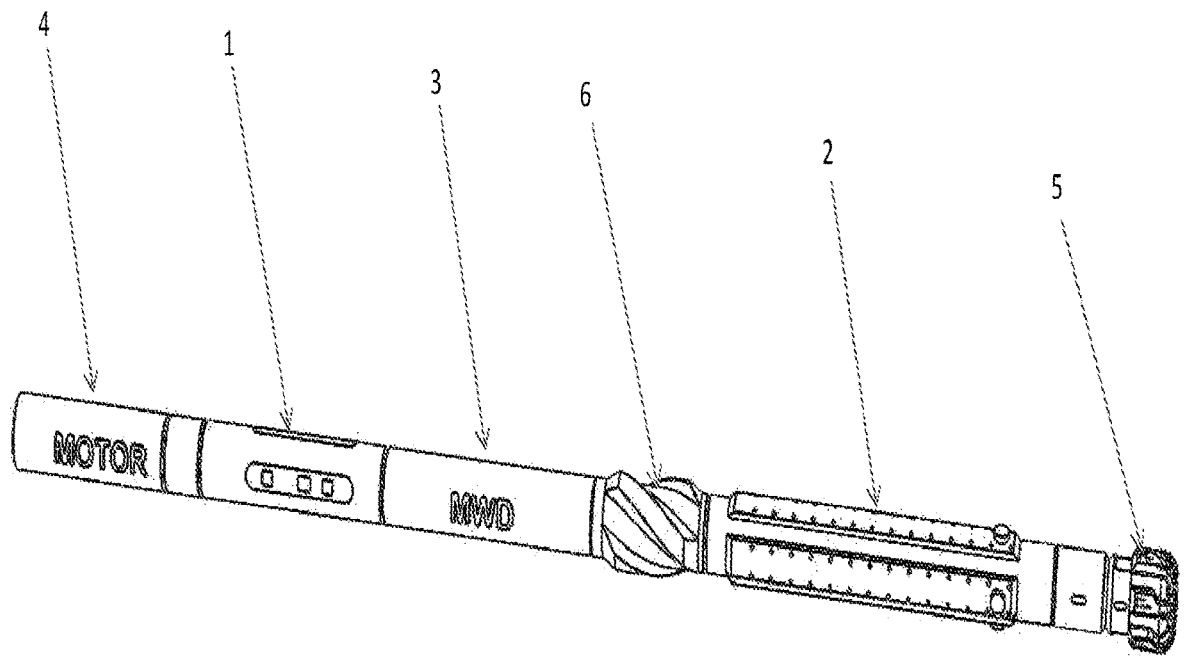
FIG. 4. Illustrates integration of UBHAN above an MWD for real time measurements.
Figure 5:
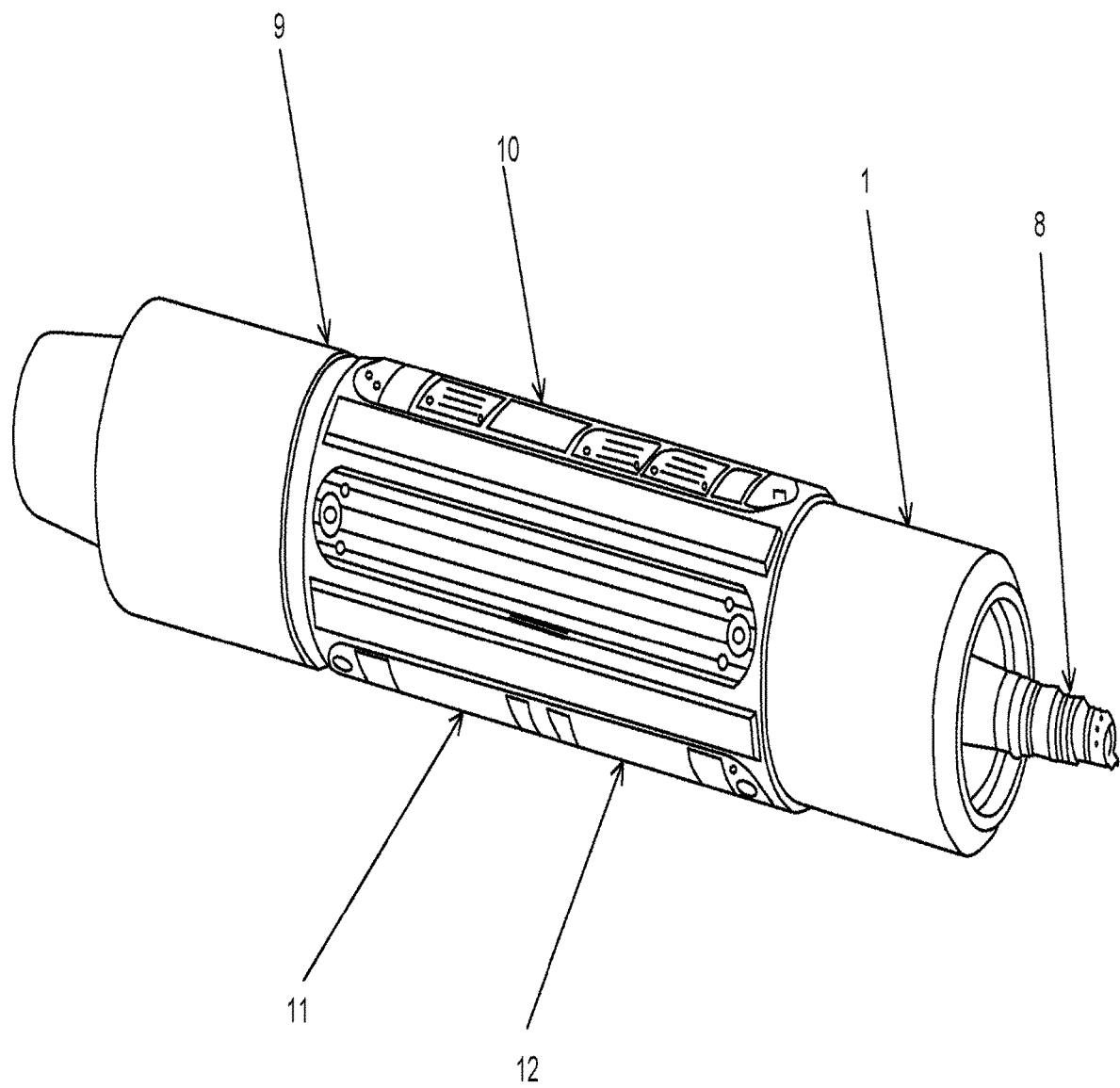
FIG. 5. Illustrates UBHAN for integration shown in FIG. 1 for communications using mass isolator (GAP) and/or real time measurements.
Figure 6:
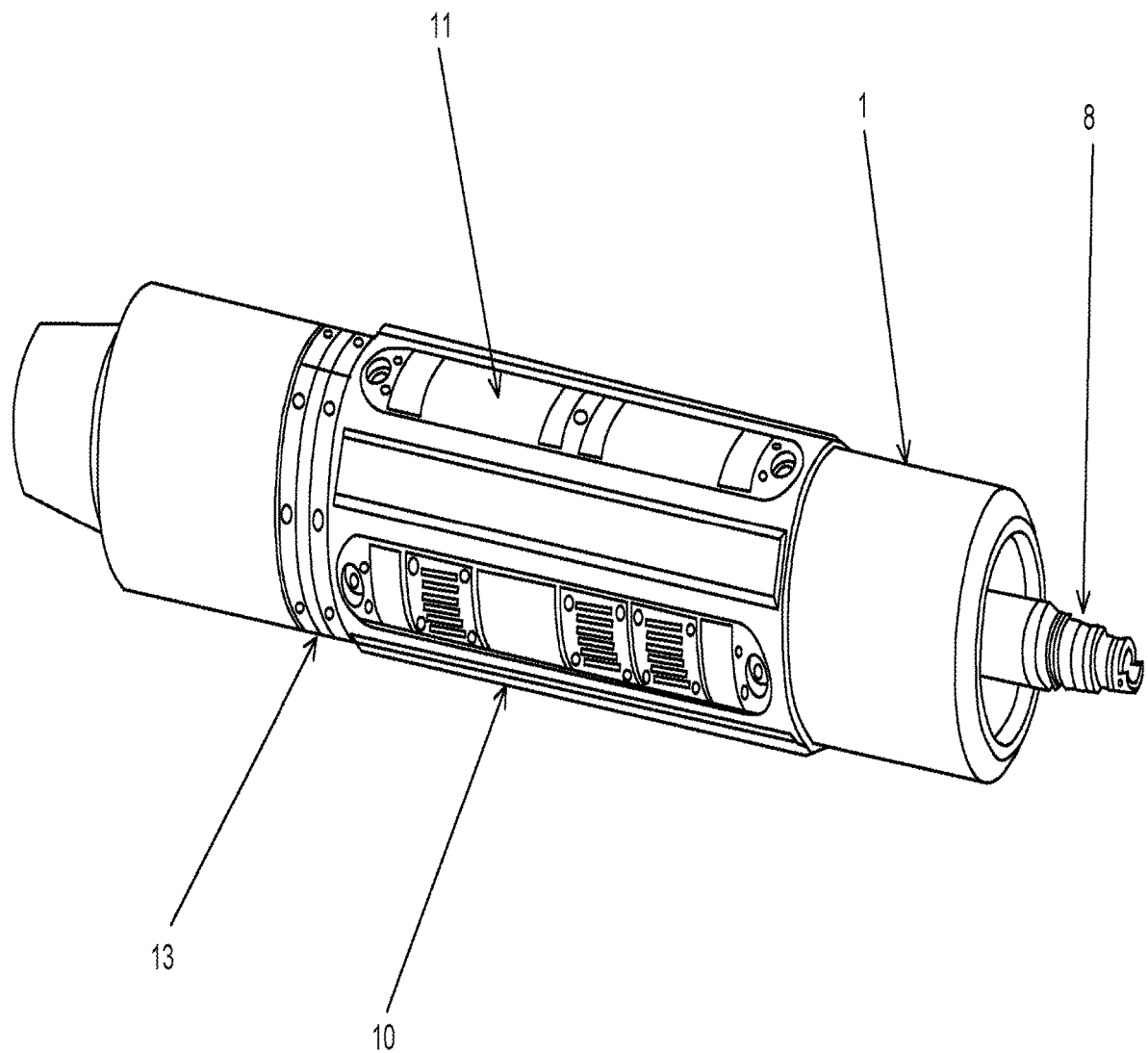
FIG. 6. Illustrates UBHAN for integration shown in FIG. 1 for communications using EM antenna and/or real time measurements.
Figure 8:
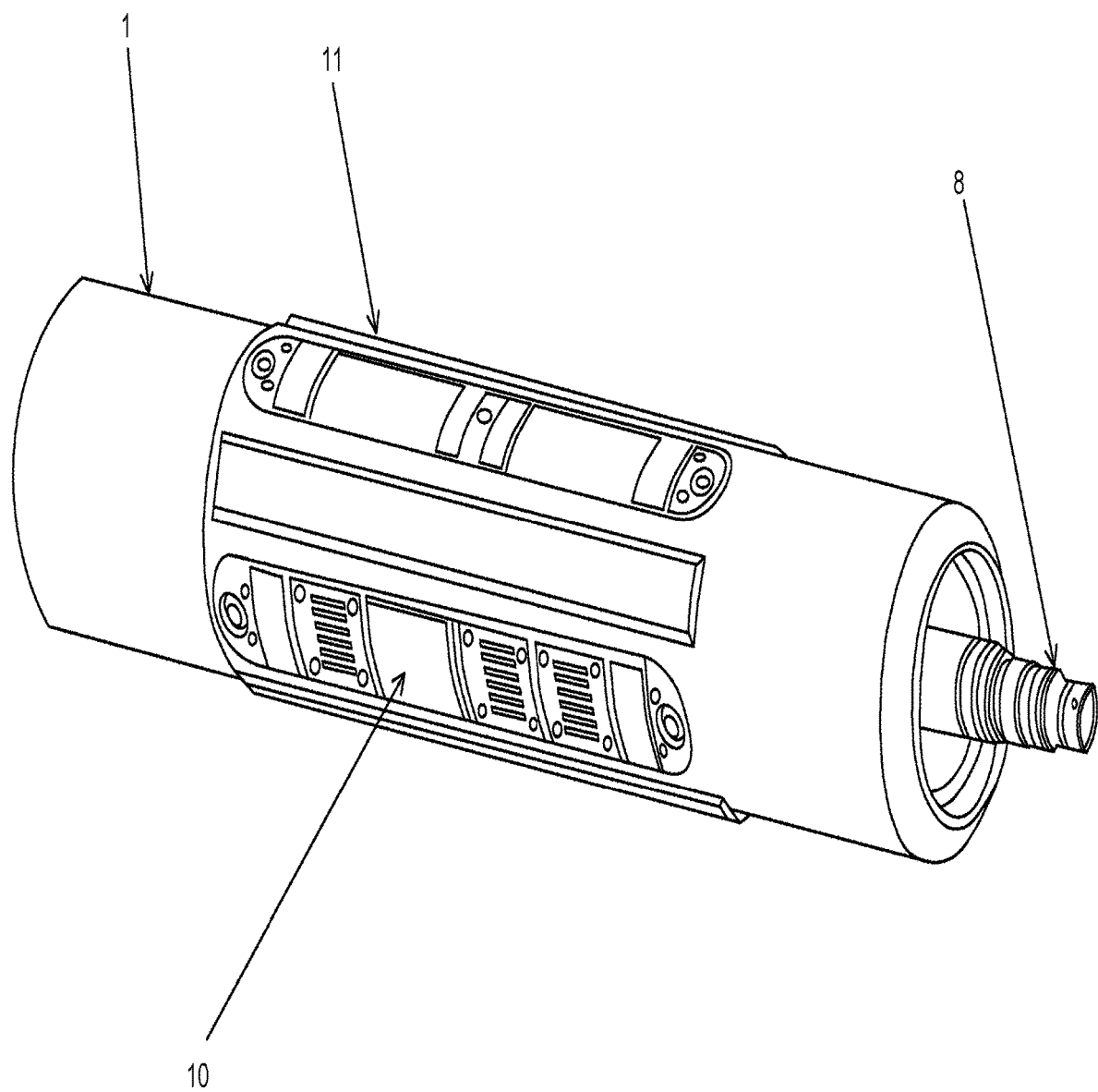
FIG. 8. Illustrates UBHAN for integration shown in FIG. 4. for real time measurements.

FIG. 4 illustrates a configuration where UBHAN is above the MWD system and sends the real time measurements to the RSS through it. For this particular configuration a representative design of UBHAN is shown on FIG. 8. As shown, it may provide the data directly to the MWD system and therefore may not need a short hop transmission capability.

Figure 9:
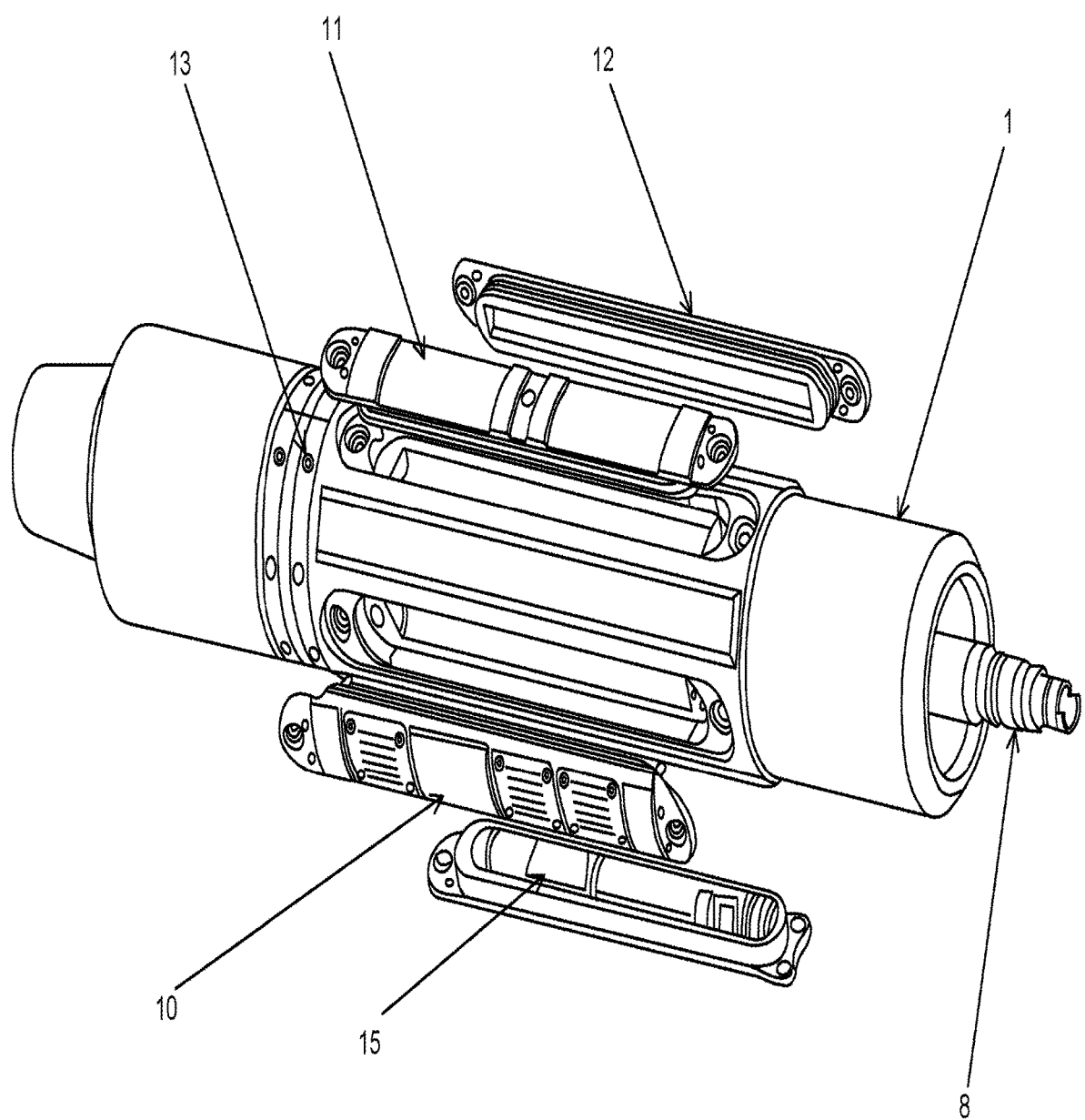
FIG. 9. Illustrates a representative design of UBHAN from FIG. 6 with EM antenna for communications and AziRes and PWD Measurements.
Figure 10:
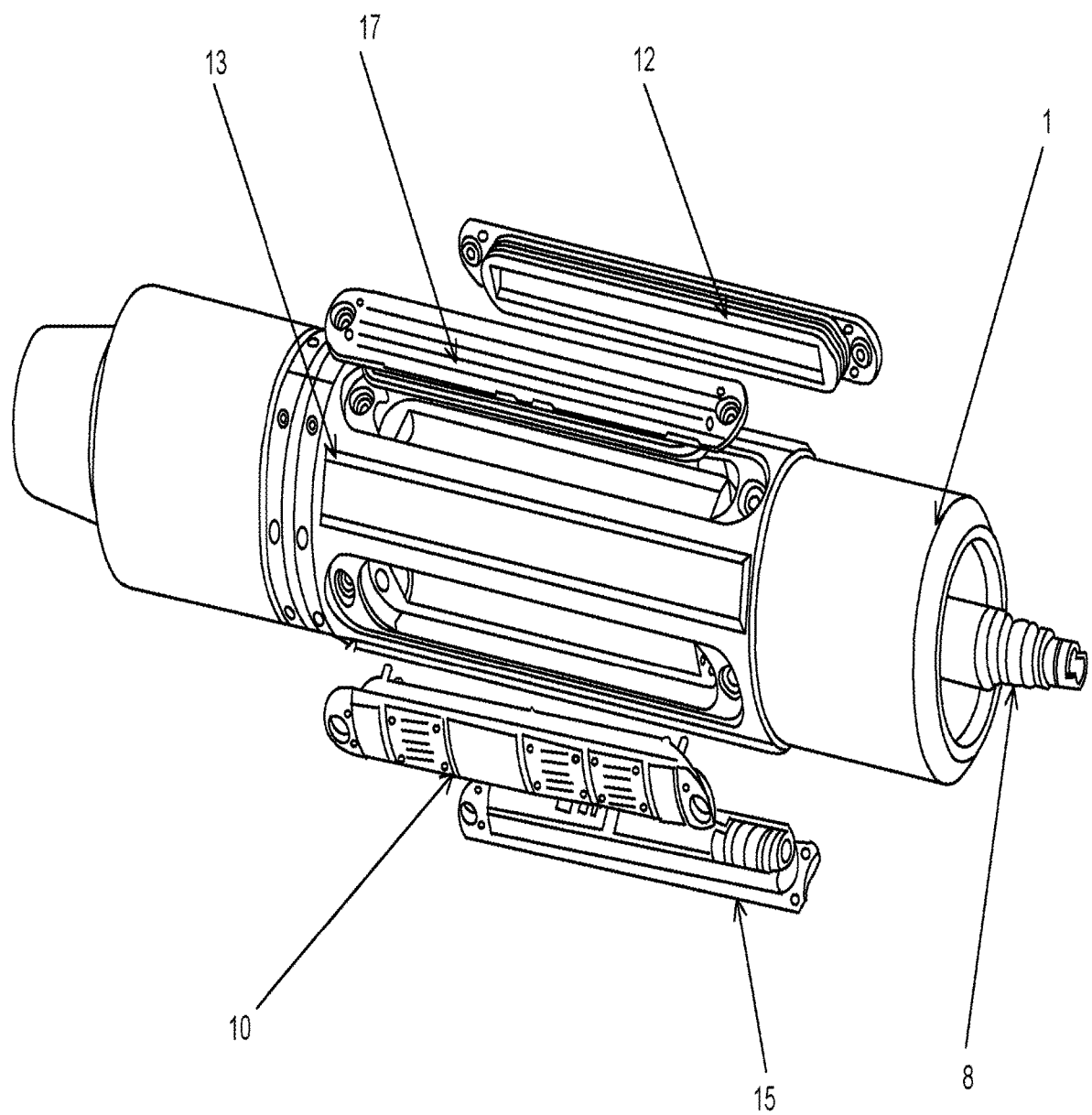
FIG. 10. Illustrates a representative design of UBHAN from FIG. 6 with EM antenna for communications and AziRes and AziG measurements.

FIG. 9 illustrates a specific design of the UBHAN 1 as a blown up assembly drawing. That specific design comprises of an UBHAN module with body 1 holding an AziRes module 10, a PWD module 11, a battery 12, an electronics module 15, and an EM antenna 13. FIG. 10 shows an AziG module 17 instead of a PWD module. The EM antenna 13 in both FIGS. 9 and 10 can be GAP. The electronics module 11 may comprise the electronics for power supplies, measurement transmitting and receiving circuits, MPU for data analysis and/or processing, and/or transmitter and/or receiver for the communications. As shown in FIGS. 5-10 the bottom datalink 8 may facilitate data communications in some embodiments.

Figure 11:
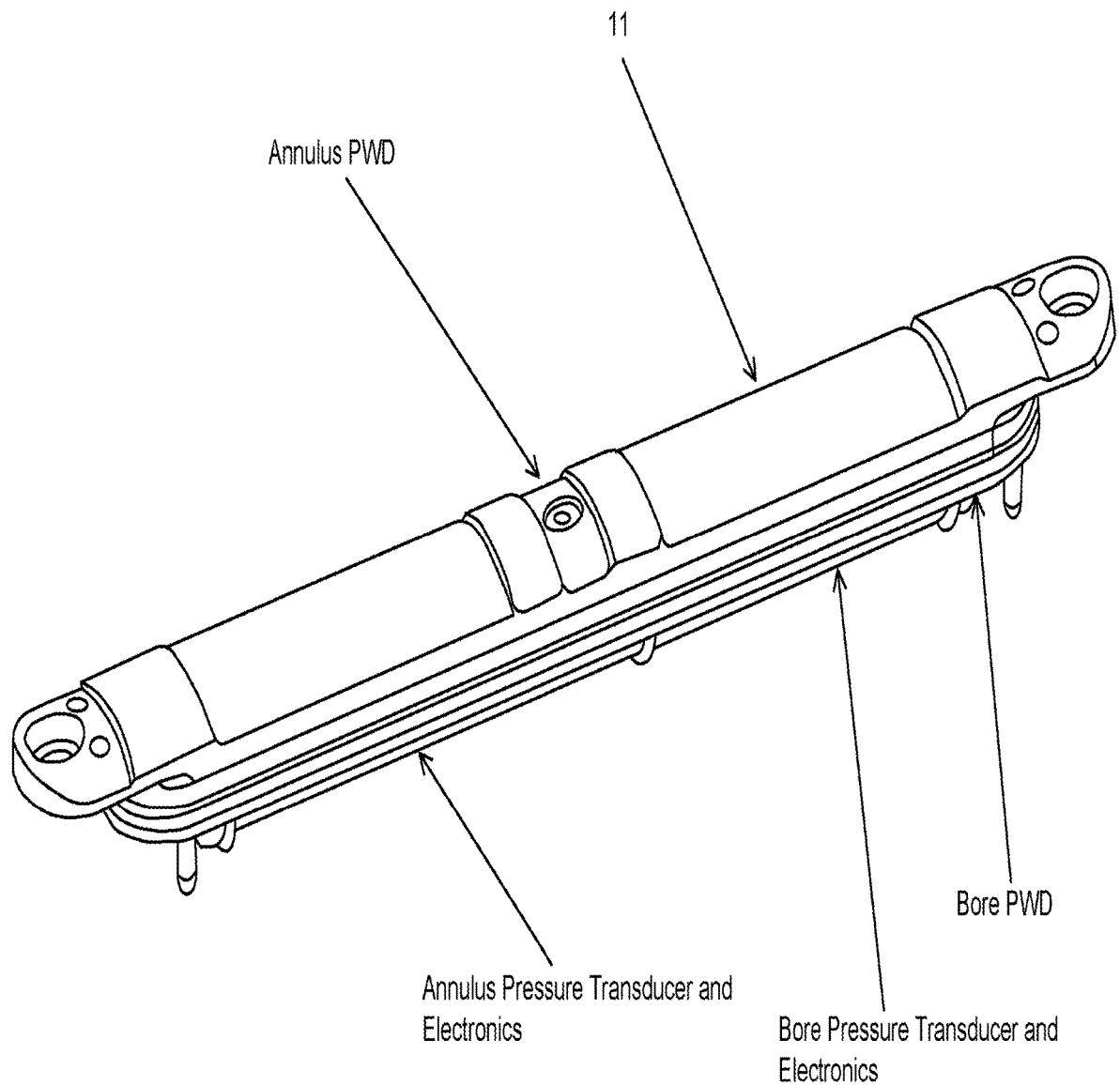
FIG. 11. Illustrates a representative design of PWD module.

FIG. 11 illustrates a representative PWD module 11 and it may comprise one or more of the following: Annulus pressure transducer and electronics with an annulus pressure intake on top as shown. In this embodiment the bore pressure transducer and electronics have a pressure intake on bottom as shown. The electronics of the pressure transducers typically process data and values of both pressures may be sent to UBHAN electronics 15 for sending to MWD/SS, if desired. Based on these values the SS 7 can, if desired, be configured to evaluate the need for well control measures (e.g. increasing the mud weight to prevent blowout) and often this may be valuable real time data. The SS may evaluate the efficiency of, for example, drilling hydraulics and/or mud motor efficiency using, if desired, real time pressure values.

Figure 12:
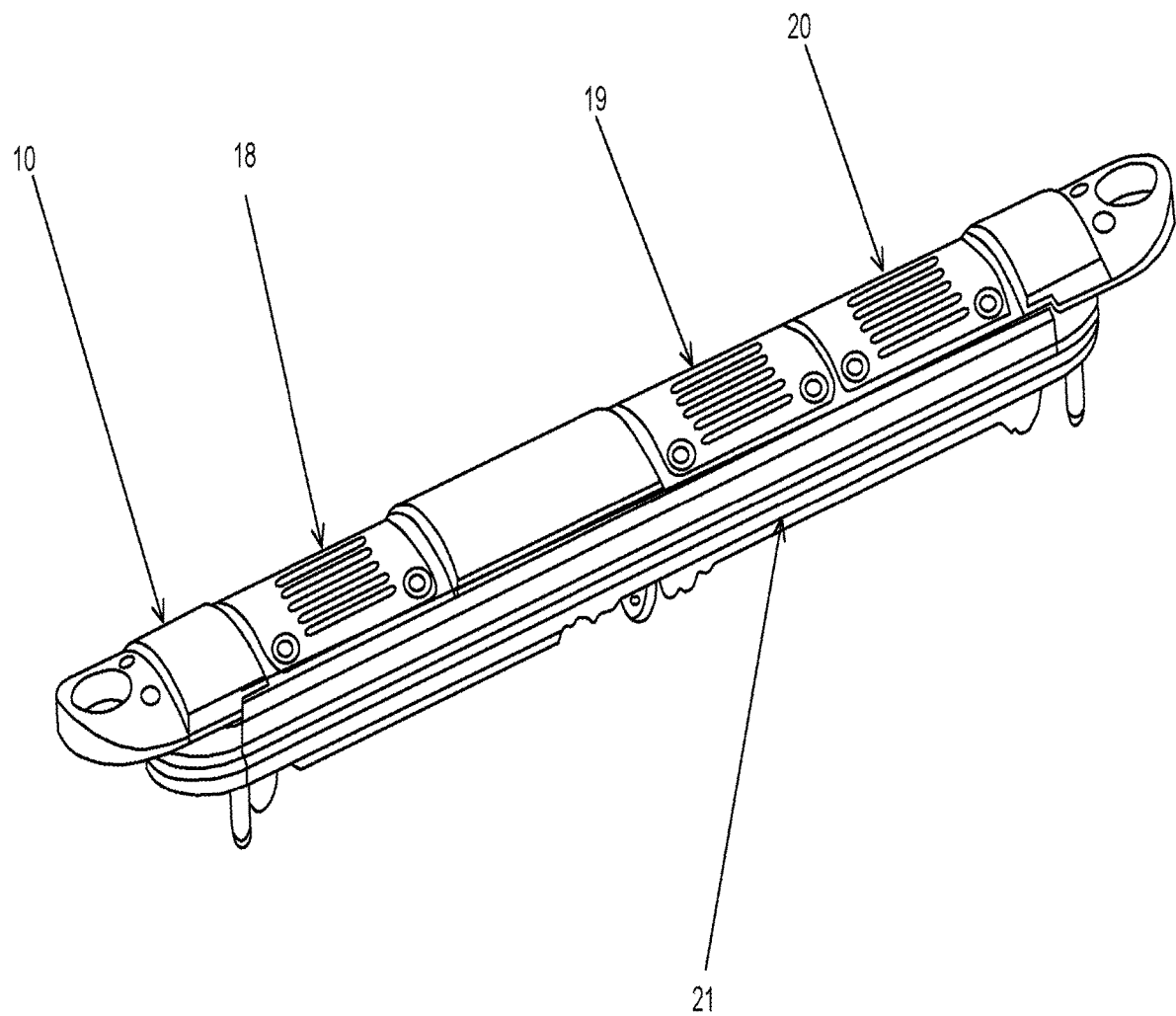
FIG. 12. Illustrates a representative design of AziRes module.

FIG. 12. Illustrates an Azimuthal Resistivity Module for UBHAN 10. The AziRes module for UBHAN may contain a Transmitter 18, a Receiver 19, a Receiver 20, and electronics 21 comprising, for example, power supplies, transmitting and receiving circuitry, an MPU board for data processing and/or sending measurement data to UBHAN electronics for potential sharing with an RSS, MWD, and/or SS.

One or more aspects of the azimuthal resistivity module for UBHAN 10 may be shown in one or more embodiments of Modular Resistivity Sensor for Downhole Measurement While Drilling U.S. Pat. Nos. 10,337,322: 9,638,819 and Patent Applications 20190277136 and 20180024266 which are incorporated herein by reference.

The UBHAN can have two AziRes modules when precise geosteering is needed and/or the prime application. The two modules will, for example, provide redundancy and very high precision boundary detection. To do the AziRes measurements and distance to boundary, a tool face sensor is provided to record the AziRes modules tool face angles as the UBHAN collar rotates. The tool face sensor can be a magnetometer, an accelerator, a gyroscope or other tool face sensors known to one skilled in the art. The resistivity measurements taken by the modular resistivity sensor can then be paired with the tool face angle measurements to produce a resistivity image as a function of tool face and a function of depth.

Figure 13:
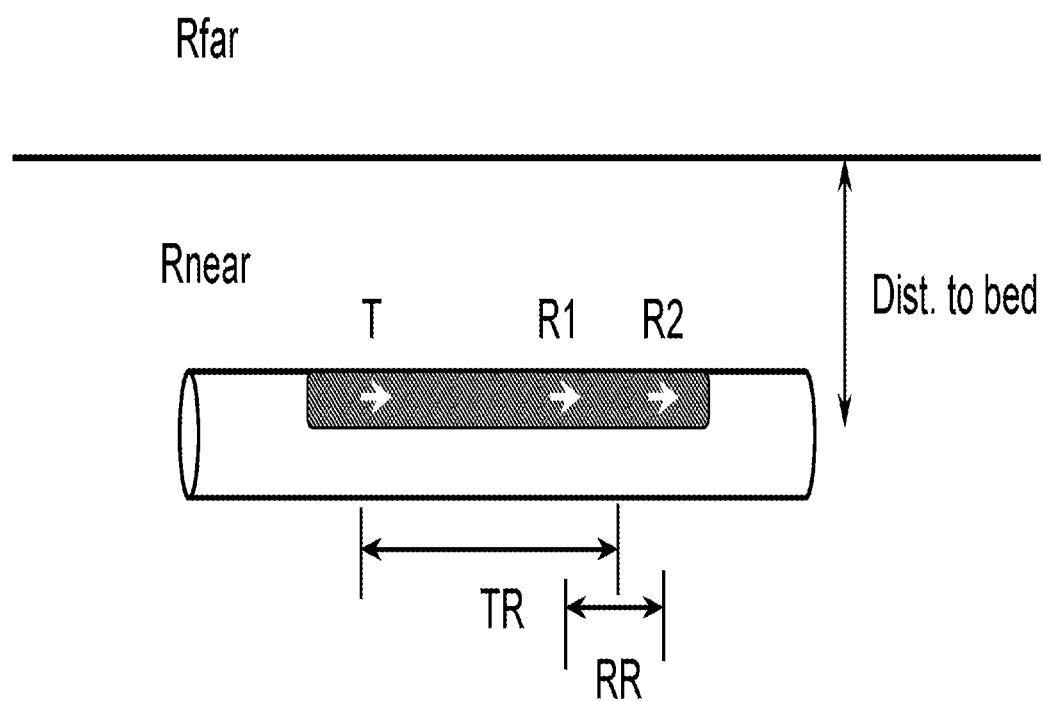
FIG. 13. Illustrates a computer model of the measurement flow of a representative AziRes module.

A computer model is created to illustrate the azimuthal resolution of a side-mounted modular resistivity sensor. In the model, a sensor is placed parallel to the bed boundary as illustrated in FIG. 13. 'T' stands for the transmitting antenna 18 and 'R1' and 'R2' for the receiving antennas 19 and 20. Both attenuation and phase difference are measured between the two receivers. The front side of the sensor is defined as one facing the bed boundary and the back side faces the opposite direction. The difference in the attenuation and/or measurements between the front and the back sides gives an indication of the azimuthal resolution of the sensor. In general, the larger the difference, the better azimuthal resolution the sensor will have.

Figure 14:
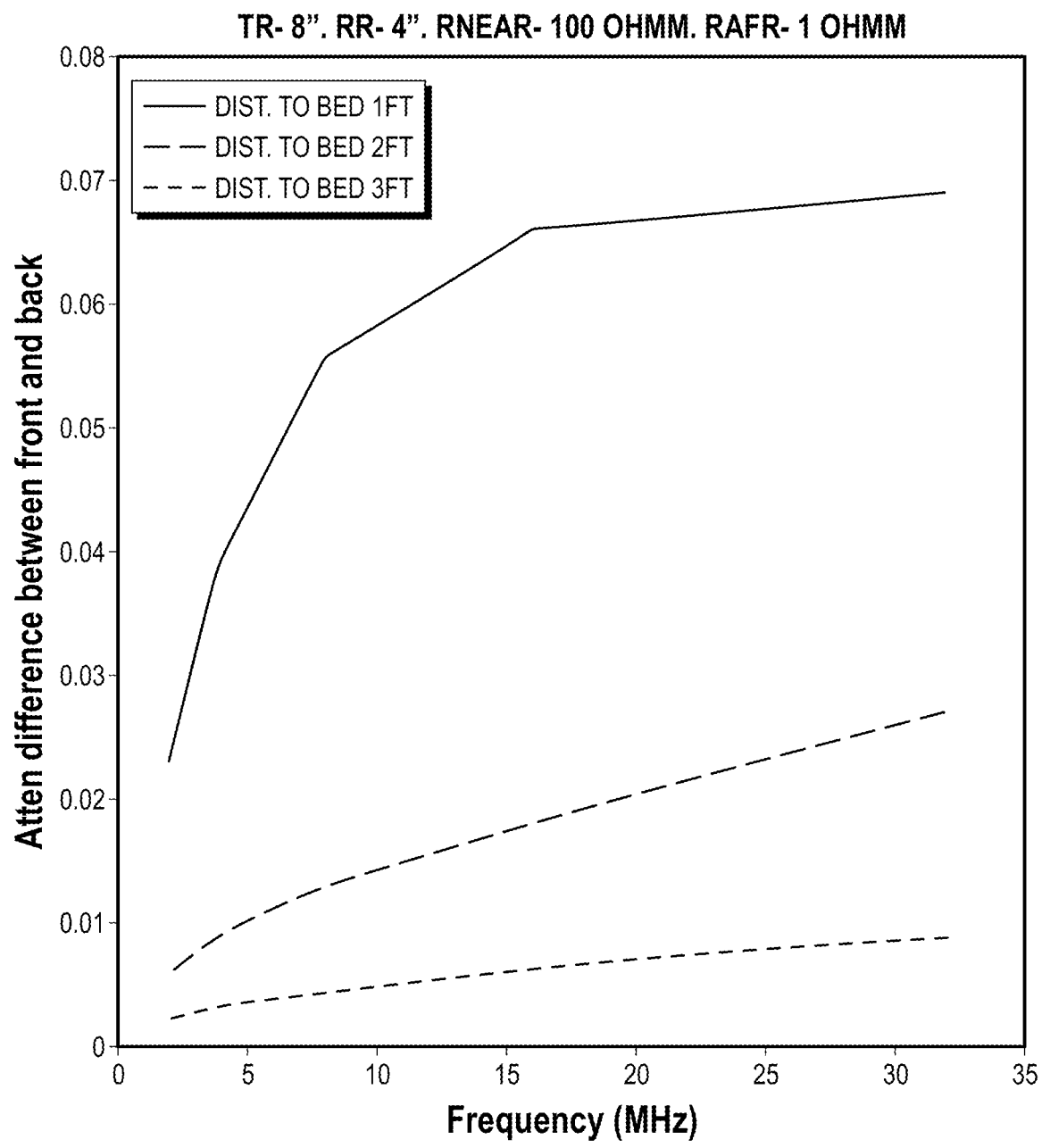
FIG. 14. Illustrates attenuation measurements of a representative AziRes module.

FIG. 14 shows the differences in the attenuation measurements (in dB) in the presence of a bed boundary separating a 1-ohmm bed from a 100-ohmm bed with the sensor in the 100-ohmm bed. The diameter of the collar in this specific embodiment is 5 in. and the transmitter coil to the center of the receiver coils is 8 in. The spacing between the two receiving coils in this embodiment is 4 in. As illustrated in FIG. 7, it has been discovered that a higher frequency may help improve the azimuthal resolution of the sensor. Second, it has been discovered that the azimuthal resolution of the sensor decreases as the distance to the bed boundary increases. Third, it has been discovered that the front side generally measures a higher attenuation than the back side. While not wishing to be bound to any particular theory this is likely because the front side faces a more conductive bed. Hence, by measuring the tool face angles corresponding to the front and the back sides, it is possible to determine the azimuthal direction of the bed boundary relative to the tool.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A bottom hole assembly comprising:
   (1) a universal bottom hole assembly node module wherein the universal bottom hole assembly node module is configured to provide direct two way communication between two or more components of the bottom hole assembly to enable real-time geosteering; and
   (2) a pressure while drilling module;
   wherein the universal bottom hole assembly node module comprises at least one selected from the group of an azimuthal resistivity module, an azimuthal gamma module, or any combination thereof.

2. The bottom hole assembly of claim 1, wherein the two way communication comprises providing azimuthal resistivity values to a measurement while drilling system and to a rotary steerable system and wherein the bottom hole assembly is configured to make real time geosteering decisions based upon at least a portion of the provided azimuthal resistivity values.

3. The bottom hole assembly of claim 1, wherein the two way communication comprises providing azimuthal gamma values to a measurement while drilling system and to a rotary steerable system and wherein the bottom hole assembly is configured to make real time geosteering decisions based upon at least a portion of the provided azimuthal gamma values.

4. The bottom hole assembly of claim 1, wherein the two way communication comprises providing both azimuthal resistivity values and azimuthal gamma values to a measurement while drilling system and to a rotary steerable system and wherein the bottom hole assembly is configured to make real time geosteering decisions based upon at least a portion of the provided data.

5. The bottom hole assembly of claim 1, wherein the universal bottom hole assembly node module is configured to provide, via an antenna the two way communication between a rotary steerable system and a measurement while drilling system.

6. The bottom hole assembly of claim 1, wherein one or more electromagnetic antennas are configured for direct connection to a rotary steerable system and a measurement while drilling system.

7. The bottom hole assembly of claim 1, wherein the two way communication comprises providing data from the bottom hole assembly to the universal bottom hole assembly node module and a measurement while drilling system.

8. The bottom hole assembly of claim 1, wherein the universal bottom hole assembly node module is configured to communicate with a surface system thru a measurement while drilling system.

9. The bottom hole assembly of claim 1, wherein the universal bottom hole assembly node is configured to communicate one or more well bore pressure values to a surface system thru a measurement while drilling system.

10. The bottom hole assembly of claim 1, wherein the universal bottom hole assembly node module is configured to communicate an internal drill string pressure values to a surface system thru a measurement while drilling system.

11. The bottom hole assembly of claim 1, wherein the universal bottom hole assembly node module comprises one or more datalinks for direct connection to a rotary steerable system, a measurement while drilling system, or any combination thereof.

12. The bottom hole assembly of claim 1, wherein the universal bottom hole assembly node module comprises a thru bus for integration into a measurement while drilling system.

13. The bottom hole assembly of claim 1, wherein the universal bottom hole assembly node module is self-powered.

14. The bottom hole assembly of claim 1, wherein the universal bottom hole assembly node module is powered by a battery.

15. A bottom hole assembly comprising:
   (1) a universal bottom hole assembly node module wherein the universal bottom hole assembly node module is configured to provide direct two way communication between two or more components of the bottom hole assembly to enable real-time geosteering, and
   (2) a pressure while drilling module, wherein the universal bottom hole assembly node module is configured to communicate with a surface system.

16. A universal bottom hole assembly node module comprising:
   a pressure while drilling module; and
   a communication system configured to provide direct two way communication between two or more components of the bottom hole assembly, wherein the communication system comprises:
   (1) one or more datalinks configured for the direct two way communication between two or more components of the bottom hole assembly; or
   (2) an antenna configured for the direct two way communication between two or more components of the bottom hole assembly; or
   (3) one or more electromagnetic antennas configured for the direct two way communication between two or more components of the bottom hole assembly; or
   (4) any combination of (1), (2), and (3),
   wherein the universal bottom hole assembly node module enables real-time geosteering.

17. The universal bottom hole assembly node module of claim 16, wherein the universal bottom hole assembly node module enables real-time geosteering based upon azimuthal gamma values.

* * * * *